United States Patent Office 3,605,214
Patented Sept. 20, 1971

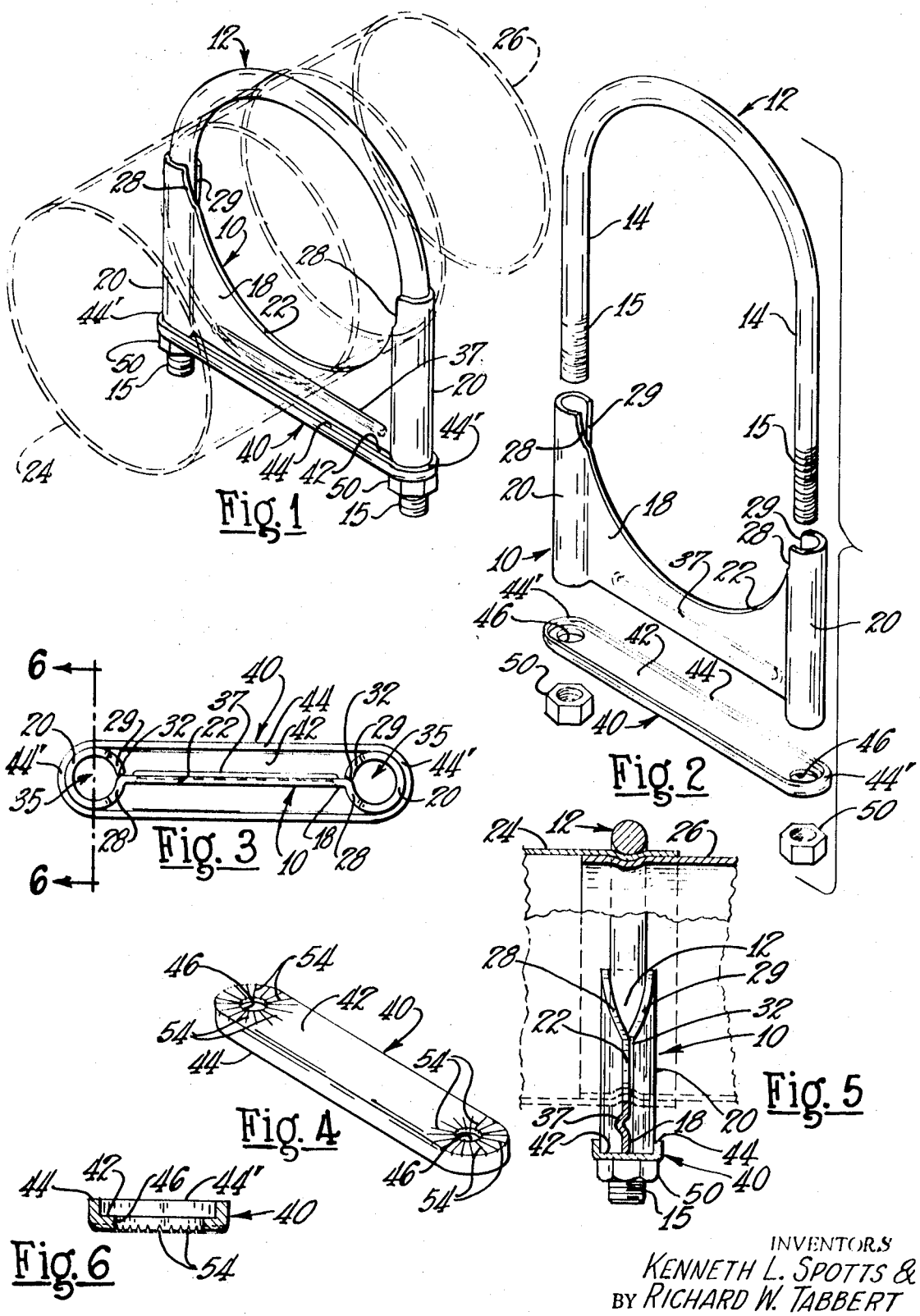

3,605,214
CLAMP FOR TUBING
Kenneth L. Spotts, Ottawa Lake, Mich., and Richard W. Tabbert, Toledo, Ohio, assignors to Questor Corporation, Toledo, Ohio
Filed July 17, 1970, Ser. No. 55,755
Int. Cl. B65d 63/00
U.S. Cl. 24—277                                          15 Claims

ABSTRACT OF THE DISCLOSURE

The disclosure embraces a U-bolt and saddle clamp construction of the character employed for clamping sections of tubing in telescoped relation, the clamp construction embodying a reinforcing tray or connector to resist distortion of the metal of the saddle member embracing legs of the U-bolt, the reinforcing member or tray having openings accommodating the legs of the U-bolt with the surface regions adjacent the openings having radially disposed indentations or recesses engaged by the securing nuts to resist loosening of the nuts.

---

This invention relates to clamps for tubing and more especially to improvements in a type of clamp generally referred to as a U-clamp or saddle clamp of a character particularly usable for clamping or retaining sections of tubing in telescoped relation or for securing flexible tubing onto a pipe or wherever it is desired to clamp a tubular member of circular cross section in engagement with a second tubular member telescoped therewith.

U-clamps or saddle clamps have been conventionally employed for clamping exhaust pipes or tail pipes in telescoping relation with nipples or tubular connectors of exhaust muffler constructions used in exhaust systems of internal combustion engines to effect a gas tight seal between the contiguous overlapping surfaces of the telescoped pipes, tubing, nipples or connectors. One type of U-clamp heretofore employed for the purpose includes a saddle member and a U-shaped bolt, the saddle member having a semicircular edge surface for engagement with a tubular member, the saddle member having tubular configurations surrounding the legs of the U-bolt, the end regions of the U-bolt being threaded to accommodate conventional securing nuts for drawing the saddle member and U-bolt into snug engagement with a tubular member.

It has been conventional practice to utilize a conventional spring or lock washer between each securing nut and the saddle member. This type of clamp construction is shown in the Osborn and Tabbert U.S. Pat. 3,192,593. In such construction, the tubular configurations are fashioned by bending portions of a saddle member into tubular shape for accommodating the legs of a U-bolt without welding the free edges of the tubular configuration to the web of the saddle member.

In the installation of saddle clamp members of the character shown in Osborn and Tabbert Patent 3,192,593, the person making the installation may exert excessive pressure in drawing up the securing nuts on the U-bolt to an extent as to cause the tubular configurations of the saddle member to open up, thereby impairing the seal between the contiguous regions of tubular telescoped members. Furthermore, with such clamp constructions, spring or lock washers are employed engaged by the securing nuts to resist reverse rotation of the nuts which would result in the clamp construction becoming loosened.

The present invention embraces an improved saddle clamp construction wherein the legs of the U-shaped bolt are engaged with a reinforcing member or connector shaped to embrace end regions of the tubular configurations on a saddle member preventing distortion of the tubular regions of the saddle member when securing nuts are drawn up in tube clamping positions.

Another object of the invention resides in the provision of a tube clamp construction embodying a connecting member engaged with the legs of a U-shaped bolt, the connecting member having flange means engaging the end regions of the tubular configurations on the saddle member accommodating the legs of the U-shaped bolt, the flange means being shaped to prevent distortion of the tubular configurations and to provide reinforcement for the connecting member to resist distortion of the connecting member and the saddle clamp member when the securing nuts are drawn into tube clamping position.

Another object of the invention resides in a saddle clamp construction embodying a connector accommodating the legs of a U-bolt of the clamp construction wherein the regions of the connector engaged by securing nuts are of serrated configuration to effectively lock or secure the nuts in drawn up or clamp tightened position and thereby eliminating the use of lock washers or other extraneous nut locking means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is an isometric view of a saddle clamp construction embodying a form of the invention;

FIG. 2 is an isometric view of the components of the clamp construction disposed in unassembled spaced relation;

FIG. 3 is a top plan view of the saddle member and a connecting member reinforcing the saddle member;

FIG. 4 is an isometric view of a form of connecting member;

FIG. 5 is a vertical sectional view through the clamp construction with the components in tube clamping position, and FIG. 6 is an enlarged sectional view through the connecting member, the view being taken substantially on the line 6—6 of FIG. 3 illustrating a serrated region of the connecting members.

While the saddle type clamp construction of the invention is particularly adapted for clamping an exhaust pipe or tail pipe with tubular extensions or fittings of a muffler for use in the exhaust gas system of an internal combustion engine, it is to be understood that the clamp construction may be utilized for clamping other telescoped tubular members to provide a sealing engagement.

Referring to the drawings in detail and initially to FIGS. 1 through 3 and 5, the form of clamp construction illustrated is inclusive of a saddle means or member 10 and a U-shaped clamping bolt 12 having legs 14, the end regions of the legs 14 being threaded as at 15. In the embodiment illustrated, the saddle member 10 is of one-piece construction, being formed with a web or planar body or body portion 18, the metal at the end regions of the web 18 being formed into cylindrically-shaped tubular portions 20 of an interior diameter to snugly, yet slidably, accommodate or receive the legs 14 of the U-shaped bolt 12.

As illustrated in FIGS. 1 and 5, the U-shaped region of the bolt 12 and semicircular edge region 22 of the web 18 embrace the exterior or circumferential region of a tube 24 which is snugly telescoped with a second tube, tubular member or fitting 26, the tubes overlapping to an extent illustrated in FIG. 5. As hereinafter explained the cooperative engagement of the U-portion of the bolt 12 and the curved or arcuate edge 22 of the web 18 provide a sealing engagement of the outer tube 24 with the inner tube 26 as illustrated in FIG. 5.

The saddle or saddle member is formed of sheet metal as, for example, sheet steel and is fashioned with the curved edge 22 of semicircular shape or configuration to snugly fit the exterior of the outer tube or tubular member 24 which is to be clamped to the tube 26. The tubular cylindrical configuration 20 at each end region of the web portion 18 of the saddle member is formed integrally with the web portion. The region of the web 18 at its juncture with each cylindrical portion 20 is shaped with a curved portion 28 of a configuration particularly shown in FIGS. 1 and 5.

The metal of the saddle member 10 is formed to complete the cylindrical configuration 20 at each end, the portion of the metal at 29 adjacent the curved portion 28 is of similarly curved configuration as shown in FIG. 5, the portions 28 and 29 forming divergent lips adapted for engagement with the exterior surface of the outermost tubular member 24, the lip portions being, in effect, continuations of the curvature of the edge 22 of the web 18.

In assembling the clamp on the tubular members, the lip portions 28 and 29 are forced into engagement with diametrically opposed regions of the tube 24 at the zone of the overlap of the semicircular inner surface of the U-portion of the bolt 12 and the divergent lips 28 and 29 to establish a sealed engagement at this region.

The terminals of the metal of the cylindrical portions 20 terminate in edges 32 parallel with the cylindrical portions, the edges 32 abutting the end regions of the web portion 18, as shown in FIGS. 3 and 5, but are unsecured to the web portion. The interior cylindrical passageways 35 provided by the tubular portions 20 are of a dimension or diameter to snugly, yet slidably, receive the leg portions 14 of the U-bolt 12 in assembly. The web portion 18 of the saddle may be fashioned with a reinforcing rib 37 by pressing a longitudinal region of the web outwardly or transversely of the plane of the web.

A means or member 40 is provided accommodating the threaded regions 15 of the U-bolt 12 and embracing the lower end regions of the cylindrical portions 20 formed on the saddle or member 10. In the embodiment illustrated, the means or connector 40 is of tray-like shape having a planar body or floor portion 42 bounded throughout its periphery by an upwardly extending flange 44. The planar portion 42 of the connecting member 40 is fashioned with openings 46 in the end regions which, in assembly with the saddle 10, are aligned with the passages 35 provided by the cylindrical portions 20, the openings 46 receiving and accommodating the threaded regions 15 of the legs 14 of the U-bolt 12.

The regions 44' of the flange 44 adjacent the openings 46 are of semicircular configuration, the inner semicylindrical surfaces of the flange portions 44' being of a dimension to snugly receive the lower ends of the cylindrical portions 20 of the saddle member, as illustrated in FIG. 3. In assembly, the tray or member 42 is engaged with the saddle body 10 with the flange 44 extending upwardly, the flange portions 44' embracing the ends of the cylindrical portions 20.

The legs of the U-bolt 12 are inserted through the cylindrical portions 20 and the openings 46 in the tray or connector 42, and conventional securing nuts 50 threaded onto the threaded portions 15 of the legs of the U-bolt. Thus, when the nuts 50 are drawn up to engage the semicylindrical region of the U-bolt and the semicircular edge 22 of the saddle body with the tubular member 24, the semicircular portion of the U-bolt, the circular edge 22 of the saddle 10 and the diverging lips 28 and 29 indent the outer tube 24 which, in turn, indents the tube 26 telescoped thereinto in the manner illustrated in FIG. 5 to establish a gas tight seal of the outer tube with the inner tube.

The tray or flanged member or connector 40 provides a reinforcing means for the web portion 18 of the saddle member and prevents spreading of the legs of the U-bolt when the U-bolt and web 18 of the saddle are forced into tube clamping position. If a person making the installation applies excessive force in drawing up the nuts 50, the flange portions 44' embracing the lower ends of the cylindrical portions 20 prevent the portions 20 from opening up, and hence avoiding impairment of the sealing engagement of the tube 24 with the tube 26.

The connector or tray 40 is fashioned with a surface configuration to resist the loosening of the nuts 50 after they have been once tightened in tube clamping position. As shown in FIGS. 4 and 6, the exterior face or surface of the body portion 42 of the tray or connector 40 adjacent each of the openings 46 is fashioned with equally-spaced serrations or recesses 54 coined into the metal of the body 42, as shown in FIGS. 4 and 6, the serrations or recesses 54 extending radially of the openings 46.

The serrations or recesses 54 are coined by impinging a die or tool into the metal of the body 42. The coining operation, in forming the serrations or recesses, results in a slightly elevated land or raised ridge between each pair of radial serrations or recesses, the slightly raised regions being provided by the displaced metal. In assembly, the radial ridges are engaged by the locking nuts 50 and function in the manner of radially arranged teeth to assist in preventing dislodgment or loosening of the securing nuts 50 after they have been drawn up into position engaging the U-clamp and saddle member 10 with the tubular member 24.

The flange means 44' at the end regions of the connector or tray 40 provide an effective arrangement for preventing distortion or opening up of the tubular portions 20 on the clamp saddle 10, and the serrated regions on the surface areas of the connector 40 engaged by the securing nuts 50 provide a locking means for preventing dislodgment or loosening of the securing nuts. This construction eliminates the need for conventional spring washers or lock washers. Furthermore, it is found to be much easier to assemble a single connector 40 onto the threaded ends 15 of the U-bolt 14 than to apply an individual lock washer to each leg of the U-bolt.

In assembling the components in the position shown in FIGS. 1 and 5, the U-bolt 12 is placed astraddle the tube 24, the saddle 10 applied by sliding the cylindrical portions 20 along the legs 14 of the U-bolt, the tray 40 assembled on the threaded ends 15 of the legs 14 with the flange means 44' embracing the lower ends of the cylindrical portions 20 and the nuts 50 threaded onto the regions 15 of the legs 14.

In drawing up the nuts 50, the edge 22 of the web 18, the U-portion of the bolts 12 and the diverging lips 28 and 29 are forced or squeezed into engagement with the outer tube 24, establishing a fluid tight seal between the tubular members 24 and 26 by indenting the telescoped tubes as illustrated in FIG. 5. By reason of the radial pressure of the lips 28 and 29 and pressures of the U-shaped portion of the bolt 12 and the edge 22 of the web 18 on the tubular member, a sealing engagement is established throughout the entire peripheries of the inner surface of the tube 26 with the outer surface of the tube 24 at the clamping region.

It is found that the connector 40 may be fashioned of metal in a range of thickness of from about thirty-six thousandths of an inch to sixty thousandths of an inch depending upon the size of the clamp used with various sizes of tubing, the tray of thicker metal being used with clamps employed for clamping tubes of large diameters. The exterior diameter of the outside or larger tubing or tubular member of a telescoped connection may be in a range of from one and one-half inches to three inches or more. The wall thickness of the tubing or tubular members may be in a range of from thirty-six thousandths of an inch to ninety thousandths of an inch. The serrations or recesses 54 in the tray 40 may be of a depth in a range of from eight thousandths of an inch to eighteen thousandths of an inch. The connector bar or tray 40 of the clamp construction provides a reinforcing means resisting opening up of the metal of the cylindrical configurations 20, and the radial serrations on the surface regions of the tray 40 engaged by the nuts 50 resists loosening of the nuts and eliminates lock washers or spring washers heretofore used with saddle clamp constructions.

It is apparent that, within the scope of the invention, modifications and different arrangements may be made other than as herein disclosed, and the present disclosure is illustrative merely, the invention comprehending all variations thereof.

We claim:

1. A clamp construction adapted to embrace cylindrically-shaped telescoped members comprising, in combination, saddle means having a web portion, said web portion having a curved region for engagement with the outermost of the said telescoped members, said saddle means having a tubular portion at each end of the web portion, clamping means for clamping the saddle means in engagement with the outermost of said telescoped members, said clamping means including spaced portions extending through the tubular portions of said saddle means, the spaced portions of the clamping means having threaded end regions, a member disposed adjacent said saddle means and having openings receiving the threaded regions of the spaced portions of the clamping means, said member having flange means adjacent each end embracing end regions of the cylindrical portions of the saddle means, the threaded regions of the spaced portions of the clamping means adapted to receive securing nuts engaging said member for securing said saddle means and said clamping means in engagment with the outermost of said telescoped members.

2. The combination according to claim 1 wherein the flange means on the member is continuous throughout the periphery of said member.

3. The combination according to claim 1 wherein said member has a plurality of indentations on the nut-engaging surface areas adjacent each of the openings in said member.

4. A clamp construction including, in combination, saddle means having a planar portion terminating at its end regions in tubular portions disposed in parallel relation, a member having flanged regions embracing an end zone of each of the tubular portions on the saddle means, said member having openings in registry with the tubular portions, clamping means having threaded portions extending through the tubular portions on the saddle means and through the openings in said member, said threaded portions arranged to receive securing nuts for securing the member in engagement with the saddle means.

5. The combination according to claim 4 including a plurality of recesses in the nut-engaging surface areas of the member adjacent the openings in the nut engaging surfaces of the member.

6. The combination according to claim 4 wherein the member is of tray-like shape having a planar portion for engagement with the said end zone of each of the tubular portions on the saddle means.

7. A clamp construction adapted to embrace cylindrically-shaped telescoped members including, in combination, a clamping bolt having a semicircular portion and spaced parallel leg portions, saddle means of sheet metal formed with a web portion and spaced parallel tubular portions joined by the web portion, said web portion having an arcuate edge region, said semicircular portion of the clamping bolt and the arcuate region of said web adapted for engagement with the outermost of the telescoped members, and a connector member having openings to receive the parallel portions of the clamping bolt, said connector member having flange means adapted to snugly embrace end regions of the tubular portions of the saddle means, the leg portions of the clamping bolt having threaded regions to receive securing nuts for securing the connector member in engagement with the saddle means and for securing the arcuate edge region of the web portion and the semicircular portion of the clamping bolt in engagement with the outermost of said telescoped members.

8. The combination according to claim 7 wherein surface areas of the connector member adjacent the openings therein have radially disposed recesses providing ridges engaged by the securing nuts.

9. The combination according to claim 7 including an elongated raised rib in the web portion of the saddle means disposed normal to the axes of the tubular portions.

10. A clamp construction adapted to embrace circular cylindrically-shaped telescoped members including, in combination, a clamping bolt formed with a semicircular portion and parallel leg portions, a saddle member of sheet metal having a web portion and spaced tubular portions, said tubular portions being integral continuations of the web portion with the distal edges of the metal defining the tubular portions in abutting engagement with the web portion, said web portion having a curved edge region of substantially the same curvature as the semicircular portion of the clamping bolt, the upper regions of the tubular portions of the saddle means having lip portions which overlap the semicircular portion of said clamping bolt, the radii of the semicircular inner surface of the clamping bolt and the curved surface of the saddle web being substantially coincident with the exterior surface of the outermost of the telescoped members, and a member having openings aligned with the tubular portions of the saddle means receiving the leg portions of the clamping bolt, said member having flange means snugly embracing the lower end regions of the tubular portions of the saddle means, the area of the lower surface of the member adjacent each of the openings having a plurality of recesses, the said recessed areas being adapted to be engaged by securing nuts threaded on the leg portions of the clamping bolt.

11. The combination according to claim 10 wherein the flange means on the connector member extends throughout the periphery of the connector member.

12. The combination according to claim 10 wherein the recesses in the nut-engaging surface areas of the member are radially disposed about the axes of the openings in the member.

13. A clamp construction adapted to embrace circular cylindrically-shaped telescoped members including, in combination, a clamping bolt having a U-shaped portion and parallel leg portions, a saddle means of sheet metal, said saddle member having a planar portion and spaced tubular portions joined by said planar portion, said tubular portions being integral continuations of the planar portion with the distal edges of the metal defining the tubular portions in abutting engagement with the planar portion, said planar portion having a curved edge region of the same curvature as the inner surface of the U-shaped portion of the clamping bolt, the upper regions of the tubular portions of the saddle means having lip portions which partially overlap the U-shaped portion of said clamping bolt, and a tray having openings aligned with the tubular portions of the saddle means receiving the leg portions of the clamping bolt, said tray having flange means snugly embracing the lower end regions of the tubular portions of the saddle means, each of the areas of the lower surface of the tray adjacent the openings having a plurality of indentations therein, said indented areas adapted to be engaged by securing nuts threaded on the leg portions of the clamping bolt.

14. A metal tray for use with a U-shaped bolt and saddle tube clamp construction wherein the saddle has spaced tubular portions joined by a web portion, said tray having a planar portion provided with openings for alignment with the tubular portions of the saddle and to receive the legs of the U-shaped bolt, said tray having flange means adapted to snugly embrace an end region of each of the tubular portions of the saddle, the areas of a surface of the planar portion of the tray adjacent each of the openings having a plurality of recesses therein, the said recessed areas being adapted to be engaged by securing nuts threaded on the legs of the clamping bolt.

15. A tray according to claim 14 wherein the recesses in the nut-engaging areas of the planar portion are radially disposed about the axes of the openings in the planar portion.

References Cited

UNITED STATES PATENTS

| | | | |
|---|---|---|---|
| 3,192,593 | 7/1965 | Osborn et al. | 24—277 |
| 3,199,815 | 8/1965 | Martinkovic et al. | 248—62X |
| 3,316,605 | 5/1967 | Tabbert | 24—277 |
| 3,329,296 | 7/1967 | Muth | 24—277X |
| 2,433,289 | 12/1947 | Morris | 285—199 |

DONALD A. GRIFFIN, Primary Examiner